United States Patent [19]

McGinnis et al.

[11] 4,416,457

[45] Nov. 22, 1983

[54] GROOVED HONEYCOMB LABYRINTH SEAL FOR STEAM TURBINES

[75] Inventors: Ralph E. McGinnis, Ridley Township, Delaware County; Lewis Gray, Nether Providence, both of Pa.

[73] Assignee: Westinghouse Electric Corp., Pittsburgh, Pa.

[21] Appl. No.: 460,693

[22] Filed: Jan. 24, 1983

[51] Int. Cl.³ .................... F16J 15/44; F01D 11/08
[52] U.S. Cl. .................................. 277/53; 277/236; 277/96.1; 415/112; 415/174
[58] Field of Search .............. 277/53, 96 R, 96.1, 277/96.2, 236, DIG. 10; 415/110–112, 170 R, 415/174

[56] References Cited

U.S. PATENT DOCUMENTS

| 3,365,172 | 1/1968 | McDonough et al. ........... 277/53 X |
| 3,603,599 | 9/1971 | Laird ..................................... 277/53 |
| 3,720,419 | 3/1973 | Adelizzi ............................... 277/53 |
| 3,867,061 | 2/1975 | Moskowitz ......................... 415/174 |
| 4,162,077 | 7/1979 | Crow et al. .......................... 277/53 |
| 4,346,904 | 8/1982 | Watkins .............................. 277/236 |

Primary Examiner—Robert S. Ward, Jr.
Attorney, Agent, or Firm—F. J. Baehr, Jr.

[57] ABSTRACT

A circular grooved honeycomb labyrinth seal having a plurality of arcuate base portions, a plurality of honeycomb-shaped cell portions extending radially inwardly from the base portion with a plurality of passages disposed adjacent the base portion, the passages being in fluid communication with each cell and with the upstream side and the downstream side of the honeycomb labyrinth seal.

7 Claims, 3 Drawing Figures

GROOVED HONEYCOMB LABYRINTH SEAL FOR STEAM TURBINES

BACKGROUND OF THE INVENTION

This invention relates to honeycomb labyrinth seals, and more particularly to such seals for low-pressure steam turbines.

Honeycomb labyrinth seals have been used in gas turbines; however, their use has not generally extended to steam turbines, particularly the low-pressure stages of the turbine which has entrained water traveling with the steam.

SUMMARY OF THE INVENTION

In general, a honeycomb labyrinth seal cooperatively associated with rotatable steam turbine blades, when made in accordance with this invention, comprises a base portion, a plurality of rows of honeycomb cells extending radially inwardly from the base portion so that each cell is open adjacent the blades, and a plurality of passages so disposed that each cell is connected to at least one passage and at least one passage is open upstream of the rows of honeycomb cells and at least one passage is open downstream to said rows of honeycomb cells, permitting steam and/or condensed steam (water) to flow through the passages and cells from the upstream side to the downstream side of the seal.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
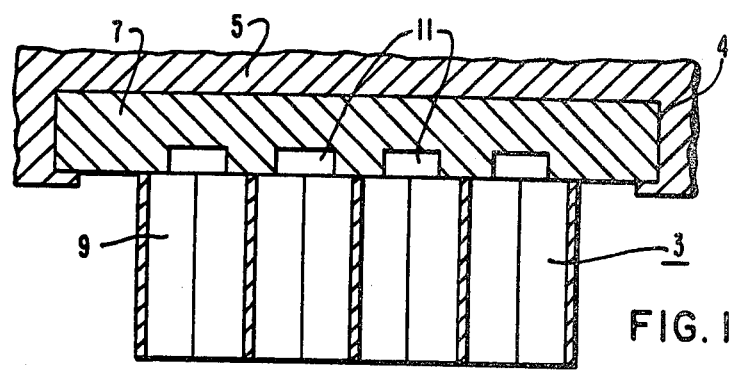
FIG. 1 is a partial sectional view of a honeycomb labyrinth seal disposed in a portion of a steam turbine.

Referring now to the drawings in detail, and in particular to FIG. 1, there is shown a tip of a rotatable steam turbine blade 1 disposed adjacent a honeycomb labyrinth seal 3 which fits into a circumferential groove 4 in an inner cylinder or blade ring 5.

Figure 2:
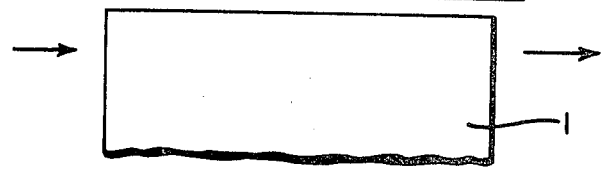
FIG. 2 is a partial sectional view taken on line II—II of FIG. 1.
Figure 2:
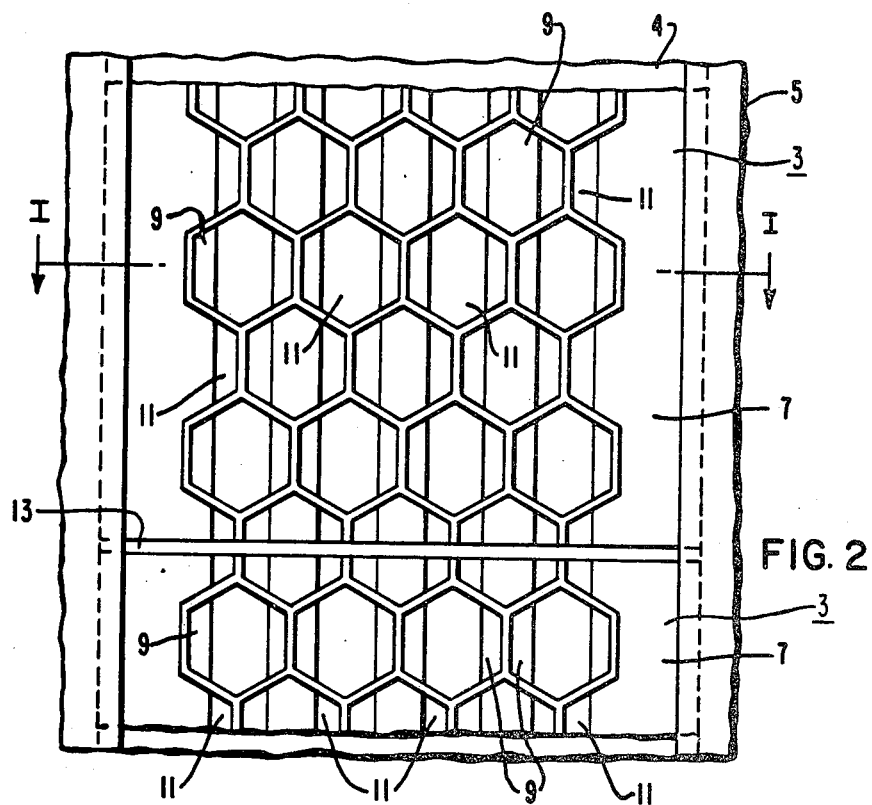

As shown in FIGS. 1 and 2, the honeycomb labyrinth seal 3 is formed from a plurality of arcuate segments each comprising a base portion 7 and a plurality of rows of honeycomb cells 9 extending radially inwardly from the base portion 7 so that each cell 9 is open adjacent the blades 1. A plurality of passages or grooves 11 are so disposed that each cell 9 is connected to at least one passage, while in this embodiment the majority of the cells are connected to two passages or grooves 11. The groove 11, on the left side of the drawing, is open to the upstream steam while the groove 11, on the right side of the drawing, is open to the downstream and there is an interconnection between the grooves 11 and the cells 9 allowing steam and water entrained in the steam to flow across the base 7 of the seal from the upstream to the downstream side of the seal. The cells 9 are generally hexagonal having six walls, a plurality of which are common with adjacent cell walls.

There is an axially disposed gap 13 between the circumferentially adjacent honeycomb labyrinth seal segments which permits water collected in the grooves 11 to drain therefrom. An appropriate drain, not shown, is also disposed in the blade ring 5 to drain the water from the seal locating groove 4 in the blade ring 5.

Figure 3:
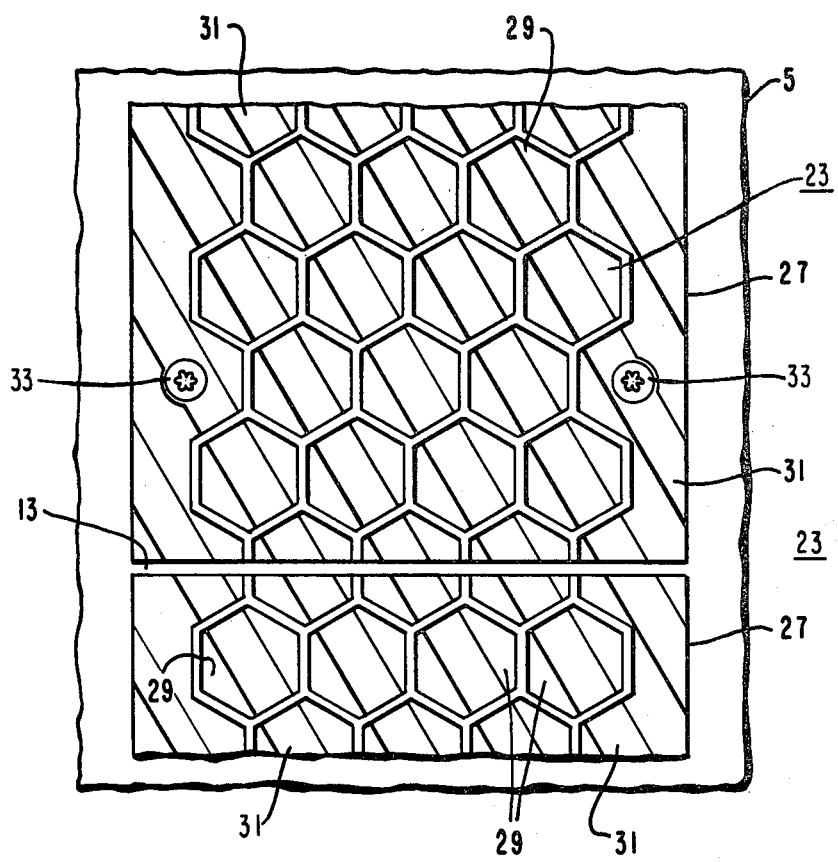
FIG. 3 is a partial sectional view of an alternate honeycomb labyrinth seal.

FIG. 3 shows an alternative honeycomb labyrinth seal 23 formed from a plurality of arcuate segments each comprising a base portion 27 and a plurality of rows of honeycomb cells 29 extending radially inwardly from the base portion 27 so that each cell 29 is open adjacent the blades. A plurality of passages or grooves 31 are disposed to extend across the base portion 27 generally from an up-stream to a down-stream side thereof. The grooves may be disposed to extend axially or as shown in FIG. 3 at an acute angle of about 30° wth respect to the margins of the base portion 27. The honeycomb labyrinth seal 23 is fastened to the inner cylinder by machine screws 33 or other fastening means.

The honeycomb labyrinth seals hereinbefore described advantageously provide a sealing device which, when located at a rotating blade tip, serves as a collector for liquid droplets discharged from the rotating blade through centrifugal action and permits drainage of this liguid in a manner which minimizes the possibility of reentrainment in the path of the rotating blades, minimizes the possibility of blade tip erosion resulting from liquid reentrainment, provides a drainage path for liquid accumulating upstream of the seal, provides positive drainage of liquid flow through the interconnecting passages in a generally downstream direction resulting from the axial pressure gradient imposed by the blade passage flow field conditions, and minimizes the steam leakage flow through the honeycomb seal by appropriate selection and sizing of the passages.

What is claimed is:

1. A honeycomb labyrinth seal cooperatively associated with rotatable steam turbine blades, said honeycomb seal comprising:
    a base portion;
    a plurality of rows of honeycomb cells extending radially inwardly from the base portion so that each cell is open adjacent said blade;
    a plurality of passages so disposed that each cell is connected to at least one passage and at least one passage is open upstream of the rows of honeycomb cells and at least one passage is open downstream of said rows of honeycomb cells, thereby permitting steam to flow through said passages and cells from the upstream side to the downstream side of said honeycomb labyrinth seal.

2. A honeycomb labyrinth seal as set forth in claim 1, wherein the passages extend circumferentially adjacent the base.

3. A honeycomb labyrinth seal as set forth in claim 1, wherein the passages are grooves disposed in the base.

4. A honeycomb labyrinth seal as set forth in claim 3, wherein the grooves extend circumferentially within the base.

5. A honeycomb labyrinth seal as set forth in claim 1, wherein the labyrinth seal is made up of arcuate segments.

6. A honeycomb labyrinth seal as set forth in claim 5, wherein there is a space between adjacent arcuate segments forming the seal.

7. A honeycomb labyrinth seal as set forth in claim 1, wherein the cells are hexagonal.

* * * * *